US012629878B2

(12) United States Patent
Garbin et al.

(10) Patent No.: US 12,629,878 B2
(45) Date of Patent: May 19, 2026

(54) MACHINE FOR APPLYING HOT-MELT PRODUCTS

(71) Applicant: FOCKE MELER GLUING SOLUTIONS, S.A., Arazuri (ES)

(72) Inventors: Valentino Garbin, Arazuri (ES); Alberto Martinez Lizarraga, Arazuri (ES)

(73) Assignee: FOCKE MELER GLUING SOLUTIONS, S.A., Arazuri (ES)

( * ) Notice: Subject to any disclaimer, the term of this patent is extended or adjusted under 35 U.S.C. 154(b) by 219 days.

(21) Appl. No.: 18/554,128

(22) PCT Filed: Apr. 6, 2022

(86) PCT No.: PCT/ES2022/070210
§ 371 (c)(1),
(2) Date: Oct. 5, 2023

(87) PCT Pub. No.: WO2022/214723
PCT Pub. Date: Oct. 13, 2022

(65) Prior Publication Data
US 2024/0190060 A1     Jun. 13, 2024

(30) Foreign Application Priority Data
Apr. 7, 2021    (ES) .................................. 202130304

(51) Int. Cl.
  B29C 48/525       (2019.01)
  B29C 48/285       (2019.01)
    (Continued)
(52) U.S. Cl.
  CPC .......... B29C 48/525 (2019.02); B29C 48/288 (2019.02); B29C 48/397 (2019.02);
    (Continued)

(58) Field of Classification Search
None
See application file for complete search history.

(56) References Cited

U.S. PATENT DOCUMENTS 3,745,200 A     7/1973    Geyer
4,025,274 A     5/1977    Uemura et al.
    (Continued)

FOREIGN PATENT DOCUMENTS

CN        106915059 A      7/2017
EP          0441762 A2     8/1991

OTHER PUBLICATIONS

Machine English translation of CN106915059A, Accessed Jun. 10, 25 (Year: 2017).*
    (Continued)

*Primary Examiner* — Abbas Rashid
*Assistant Examiner* — Adrianna N Konves
(74) *Attorney, Agent, or Firm* — LUCAS & MERCANTI, LLP

(57)        ABSTRACT

A machine for applying hot-melt products having a structural body (1) provided longitudinally on the inside with a recess (2) extending between a supply inlet (3) for the product in solid state and a discharge outlet (4) through which the product exits in fluid state for its application, the recess (2) having a spindle (5) fitted with a helical blade (9) for conveying the product through a feeding zone, a melting zone and/or a compression zone, wherein the recess (2) has a conical zone (2.1) with a narrowing separating the feeding zone from the melting zone for compacting the hot-melt product, and on the inner periphery of the conical zone (2.1) having a plurality of indentations (8).

14 Claims, 7 Drawing Sheets

(51) Int. Cl.
  *B29C 48/395*     (2019.01)
  *B29C 48/84*      (2019.01)
  *B29C 65/52*      (2006.01)

(52) U.S. Cl.
  CPC .......... *B29C 48/845* (2019.02); *B29C 65/525*
            (2013.01); *B29C 2948/92514* (2019.02)

(56)                    References Cited

U.S. PATENT DOCUMENTS

| | | | | |
|---|---|---|---|---|
| 4,099,897 | A | | 7/1978 | Takano et al. |
| 4,447,156 | A | | 5/1984 | Csongor |
| 4,944,903 | A | * | 7/1990 | Nilsson ................... B29C 48/69 |
| | | | | 425/149 |
| 5,088,621 | A | * | 2/1992 | Thompson ............ G01F 11/284 |
| | | | | 222/65 |
| 6,602,063 | B1 | | 8/2003 | Cardona |
| 2017/0362407 | A1 | * | 12/2017 | Rust ........................ B29B 17/04 |
| 2020/0214503 | A1 | * | 7/2020 | Altenritter .............. F24B 13/04 |

OTHER PUBLICATIONS

International Search Report for Corresponding International Application No. PCT/ES2022/070210, Jul. 21, 2022 and English Translation, 9 pages.

* cited by examiner

MACHINE FOR APPLYING HOT-MELT PRODUCTS

CROSS REFERENCE TO RELATED APPLICATION

This Application is a 371 of PCT/ES2022/070210, filed on Apr. 6, 2022, which claims the benefit of Spanish Patent Application No. P202130304, filed on Apr. 7, 2021, the contents of each of which are incorporated herein by reference.

TECHNICAL FIELD

The present invention is related to the application of hot-melt products, in particular to the application of hot-melt adhesives that are fed in the form of pellets or small balls, carrying out a melting to apply the product in a fluid state, proposing an extruder machine that performs the functions of feeding, melting and compressing the adhesive product in advantageous conditions.

STATE OF THE ART

Hot-melt product application systems conventionally use extruder machines in which the product is fed in the form of pellets or small balls and transferred by means of a conveyor spindle along a melting zone to an application zone where the molten product is supplied with specific fluidity and pressure conditions for each application case.

Applicator systems of this type have a series of problems, stemming from the feeding of the product in pellets and the processing necessary to provide the product with the appropriate fluidity and pressure conditions for the application.

In this sense, it should be noted that feeding at a high flow rate requires a rapid rotation of the conveyor spindle, which causes part of the product being fed to be expelled backwards, and since not all of the pellets have time to enter the conveyor, part of them are expelled by the rotation of the spindle, or the pellets can break, causing jams (due to adhesion between pellets) or an insufficient feeding.

Furthermore, it is necessary for the melting zone to be very long in order to allow time for the product to melt, given that if the time is shorter than necessary, the product will not melt properly.

Furthermore, given that there are different hot-melt products which require different melting times, it may be necessary to change the conveyor spindle when applying different products, in order to adapt the passage through the melting zone to the time required in each case. To proceed with this change, or for maintenance tasks, it is necessary to completely disassemble the spindle and, thus, disassemble the structural body of the machine. This disassembly process is complicated, which increases maintenance or replacement times for the spindle, and it can also lead to malfunctioning of the machine, due to improper handling.

In another aspect, during the application, it is necessary that the molten product be provided at a suitable pressure, and therefore it is necessary that a compression phase be carried out before the product goes to the application phase. The compression part pushes the hot gases generated during material processing towards the melting and supply zone. These gases partially melt the pellets in the supply zone, forming large conglomerates that cannot be processed, and therefore lead to losses in the feeding of the machine. Therefore, extruder machines must use an auxiliary cooling system that allows the supply part to be thermally insulated from the melting part so that there are no interruptions in the feeding of the material to be melted.

Given such particularities and problems in the application of hot-melt products, it is clear there is a need for a machine which, in the embodiment thereof, provides features that allow for the feeding, melting and compression of hot-melt products in suitable conditions for the application thereof.

OBJECT OF THE INVENTION

According to the present invention, an extruder machine is proposed for applying hot-melt products, comprising a structural body provided longitudinally on the inside with a recess extending between a supply inlet for the product in solid state and a discharge outlet through which the product exits in fluid state for its application, comprising in the recess a spindle fitted with a helical blade for conveying the product through a feeding zone, a melting or lamination zone and/or a compression zone, wherein the inner recess comprises a conical zone with a narrowing separating the feeding zone from the melting zone for compacting the hot-melt product, comprising on the periphery of the inner conical zone of the recess a plurality of indentations.

The feeding zone is where the hot-melt product is found in solid state, preferably in the form of pellets. The melting zone is the zone adjacent to the feeding zone, where the pellet goes from solid to liquid state by heating means. And the compression zone is the zone prior to the exit of the hot-melt product in which the hot-melt product is compressed in liquid state in order to be expelled according to the required pressure.

According to the invention, in the feeding zone of the proposed machine, said narrowing has a conical shape, determining a conical zone that separates the feeding zone from the melting zone. Thanks to this conical configuration, the hot-melt product pellets are compacted, reducing the spaces between the same in such a way that the melting range is increased by reducing the total volume. In this way, heating is optimised for the melting of the hot-melt product since the spaces between the pellets represent volumes of air, and thus by reducing said volumes of air the melting is optimised by heating the largest volume of product possible, minimising losses due to air heating.

However, given the speed of rotation of the spindle and the conical configuration of the recess that causes a certain impediment to progress, some pellets can move in the opposite direction to the push of the spindle, producing a rebound effect, preventing some pellets from advancing while the spindle rotates, thereby creating undesirable spaces between the pellets, leading to a less efficient melting.

To solve this problem, it is envisaged that the conical zone of the recess of the extruder machine comprises the aforementioned indentations, which are preferably arranged longitudinally in the conveyance direction of the hot-melt product. In this way, irregularities are produced on the inner surface of the conical zone that guide the pellets, preventing the pellets from returning to the supply zone and, consequently, preventing product jams during conveyance to the melting zone. The returned pellets could return partially melted or broken to the supply source, increasing the ability to adhere to other pellets, creating agglomerations at the entrance of the spindle. Consequently, said agglomerations increase the probability of causing jams that prevent the normal entry of the solid supply to the spindle.

According to a feature of the invention, it is provided that said conical zone externally comprises a plurality of external blades, such that the structural body in that zone comprises a series of blades that contribute to heat dissipation in order to avoid a partial melting of the pellet before entering the melting zone. This way, if a rebound occurs, the pellets will be less sticky and there will be a lower probability of clogging.

In order to reduce the partial melting of the pellets that may bounce back from the spindle to the supply zone, there can be thermal insulation means between the feeding zone and the melting zone.

The supply inlet of the pellet product to the part of the recess where the largest diameter section of the conveyor spindle is located also has an orientation that is out of phase with respect the spindle axis, an inclined surface being configured in the inlet with an orientation in a tangential direction with respect to the spindle, which avoids a frontal collision of the incoming product against the spindle, facilitating the entry of the product into the conveyance recess to be dragged by the spindle. This prevents the pellets from returning to the inlet or from becoming trapped between the spindle blades and the surface of the recess.

To control the level of solid product in the hopper, the same can include a level sensor that detects a maximum and minimum level for an optimal hot-melt adhesive feeding of the machine.

According to the invention, the conveyor spindle for the product comprises a plurality of sections, and preferably two sections that are axially associated with each other by a removable connection, the first section preferably corresponding to the feeding zone, and the second section to the melting and compression zone of the hot-melt product. This configuration allows modularity of the conveyor spindle to be achieved, which facilitates maintenance tasks. Furthermore, when it is necessary to replace the spindle to adapt it to the properties of the hot-melt product, it is only be necessary to decouple the second section corresponding to the melting and/or compression zone, in particular the section of the melting zone, since it adapts according to the properties of the hot-melt product.

In this way, the melting and/or compression section of the spindle can be extracted for replacement through the discharge outlet, for example by unscrewing, without having to disassemble the first section corresponding to the feeding zone, which is the one coupled to the rotating drive, and thus it is not necessary to disassemble the machine. A considerable amount of time is saved in maintenance, thereby increasing productivity. Additionally, this makes it unnecessary to manufacture complete spindles, which increases manufacturing costs and machining difficulty, being only necessary to manufacture the section that changes in configuration.

According to a feature of the invention, the machine has a spindle diameter and/or a recess diameter that is at least partially longitudinally variable. The helical blade is provided on the outer surface of the spindle, extending to occupy the recess, the diameter of the helical blade corresponding to the diameter of the recess of the machine. Thus, in the structural body of the machine, the conveyor spindle is housed in the recess that reciprocally corresponds to the diameter of the component sections of the spindle, adjusting the spindle or sections thereof to the different types of hot-melt products.

Additionally, the diameter of the spindle preferably has a progressive narrowing in the feeding zone in the conveyance direction of the product in correspondence with the conical zone of the recess. This favours the circulation of the pellet product that enters the machine to be conveyed to the melting zone.

The invention also envisages that the diameter of the spindle and/or the diameter of the recess is longitudinally uniform throughout the melting zone and/or the compression zone. This makes it easier to remove the spindle for replacement and also provides greater manufacturing simplicity.

Preferably, the inner diameter of the spindle in the melting zone is smaller than the diameter in the compression zone. This leads to greater efficiency, due to a greater heating of the product per length, achieving subsequent compression by reducing the space between the surface of the recess and the surface of the spindle.

According to a preferred embodiment, it is provided that the pitch of the helical blade of the spindle is at least partially longitudinally variable. In this way, the spindle adapts to the properties of the hot-melt product, increasing or decreasing the pitch of the blade in the same way that the diameter of the spindle varies.

Given the foregoing, the proposed machine has highly advantageous features for processing hot-melt products for which it is intended, taking on a life of its own and having a preferential nature with respect to conventional machines currently used for the same application.

DETAILED DESCRIPTION OF THE INVENTION

Figure 1:
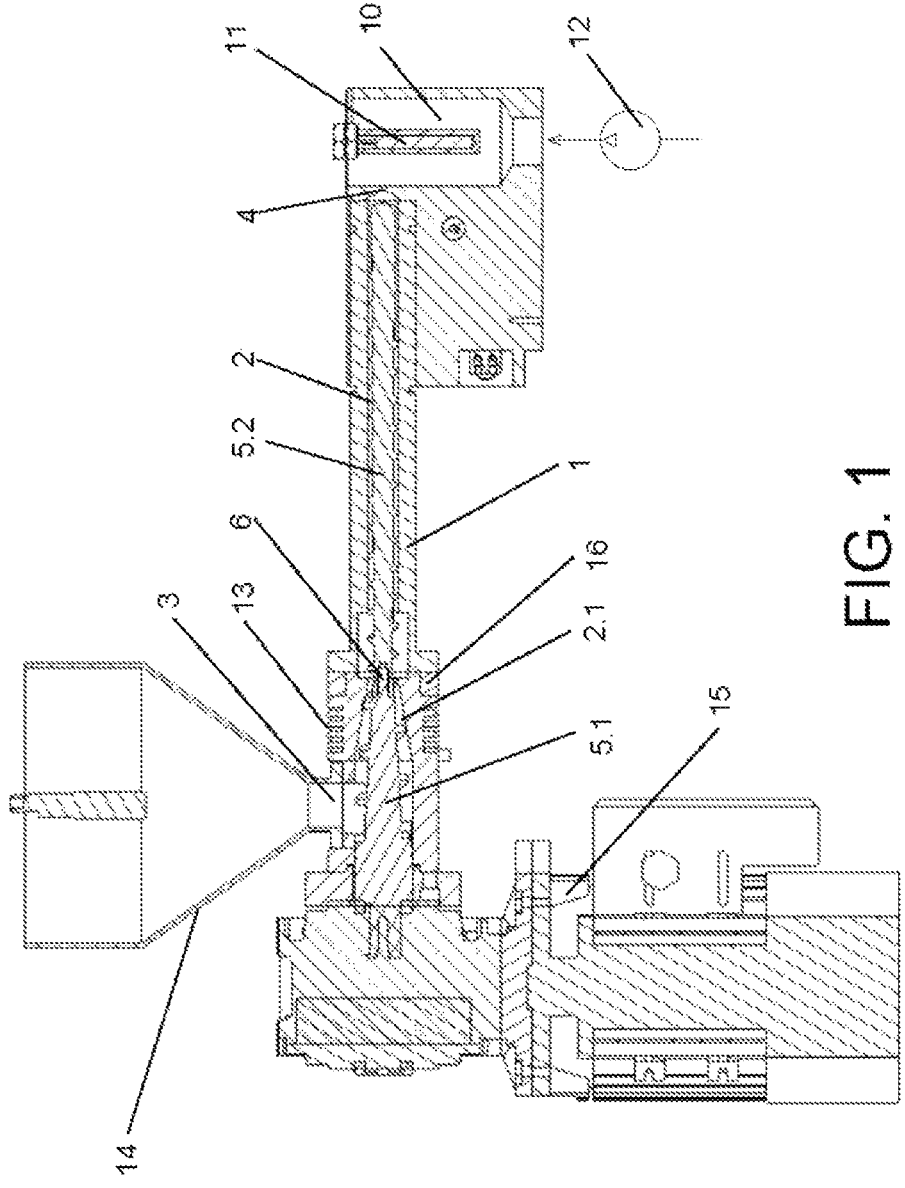
FIG. 1 shows a longitudinal cross-sectional view of an extruder machine for hot-melt products according to the object of the invention.

The object of the invention relates to a machine intended for processing hot-melt products such as polymers, especially hot-melt adhesives. The hot-melt product is supplied in solid state, particularly in the form of pellets or small balls, which must be subjected to a melting and compression process to adapt it to fluidity and pressure conditions suitable for the target application.

The machine comprises a structural body (1), which longitudinally on the inside thereof has a recess (2) that extends from a supply inlet (3) in which the solid product is supplied and a discharge outlet (4) through which the product flows in suitable conditions for the application thereof, being conveyed by the rotation of a spindle (5) thanks to helical blades (9).

Housed inside the recess (2) is the rotating spindle (5), which has the function of conveying the product that arrives through the supply inlet (3), to move it along the recess (2) to the discharge outlet (4), said spindle (5) having two sections (5.1) and (5.2) longitudinally associated in extension between them.

The two sections (5.1) and (5.2), components of the spindle (5), have structurally different diameters, the first section (5.1) having a larger diameter, with a conical longitudinal configuration, while the second spindle section (5.2) has a smaller diameter, with a cylindrical configuration.

Thus, the diameter of the recess (2) corresponds to the diameter of the helical blades (9) of the spindle (5), with the conical part that has the largest diameter corresponding to a zone into which the supply inlet (3) opens, while the cylindrical part that has a smaller diameter extends from that conical zone to the discharge outlet (4) zone. This cylindrical part passes through a melting zone, in which the product that moves through the recess (2) is subjected to heating which produces the transformation thereof from solid state to fluid state necessary for the application. After said melting, a compression stage is necessary so that the fluid product reaches the discharge outlet (4) with the necessary pressure for a suitable application. For this purpose, the second spindle section (5.2) is divided into a melting zone and a compression zone, said second spindle section (5.2) in the compression zone having a diameter greater than the diameter of the second spindle section (5.2) in the melting zone. In this way, the volume between the surface of the recess (2) and the spindle (5) is reduced, compressing the fluid for the exit thereof at a certain pressure.

The association between the two sections (5.1) and (5.2) components of the spindle (5) is established by means of a removable joint (6), such as a threaded coupling, such that when, due to the different nature of hot-melt products to be applied, it is necessary to change the spindle (5) so that the duration of the conveyance along the recess (2) is suitable to achieve the correct melting and compression conditions, it is only necessary to change the second cylindrical spindle section (5.2). Thus, it can be extracted in a relatively simple way through the end that corresponds to the coupling with the first conical spindle section (5.1), without it being necessary to disassemble said conical section (5.1), the extraction of which is more complicated, since it is the one that is coupled to the drive mechanism for the rotation (15) of the spindle (5). When there is compression, the inner radius of the spindle changes, and the sleeve maintains the same diameter. In all cases, the spindle is extracted from the feeding part.

In cases where the pressure reached by the molten product in the spindle (5) is not suitable for the correct application thereof, a reservoir (10) can be placed downstream from the discharge outlet (4) to store the product in its original fluid state. Downstream from the reservoir there can be a pump (12) that conditions the pressure of the product in fluid state. The level of hot-melt product in the reservoir (10) can be monitored by product level detection means (11).

To control the solid product supply process, the level of hot-melt adhesive in the hopper is monitored using a level sensor (not shown in the figures) which detects a maximum and minimum level for optimal machine operation.

Figures 3, 4:
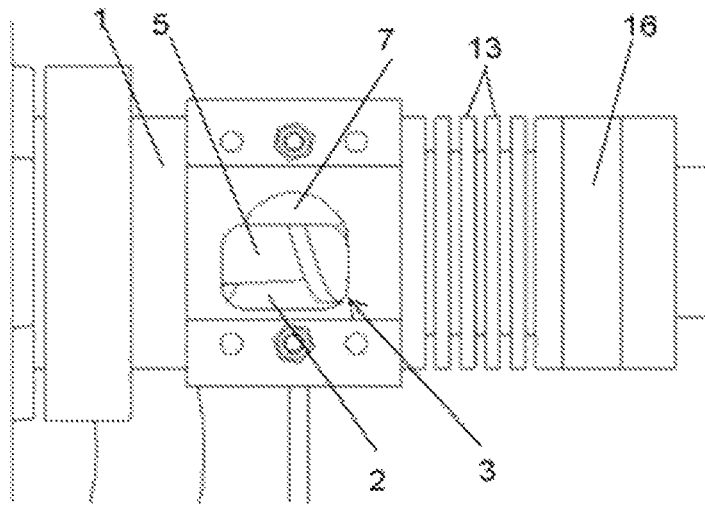
FIG. 3 is an enlarged detail of the product supply inlet zone of the extruder machine of the invention.
FIG. 4 is a front view of the hopper of the extruder machine.
Figures 5, 6:
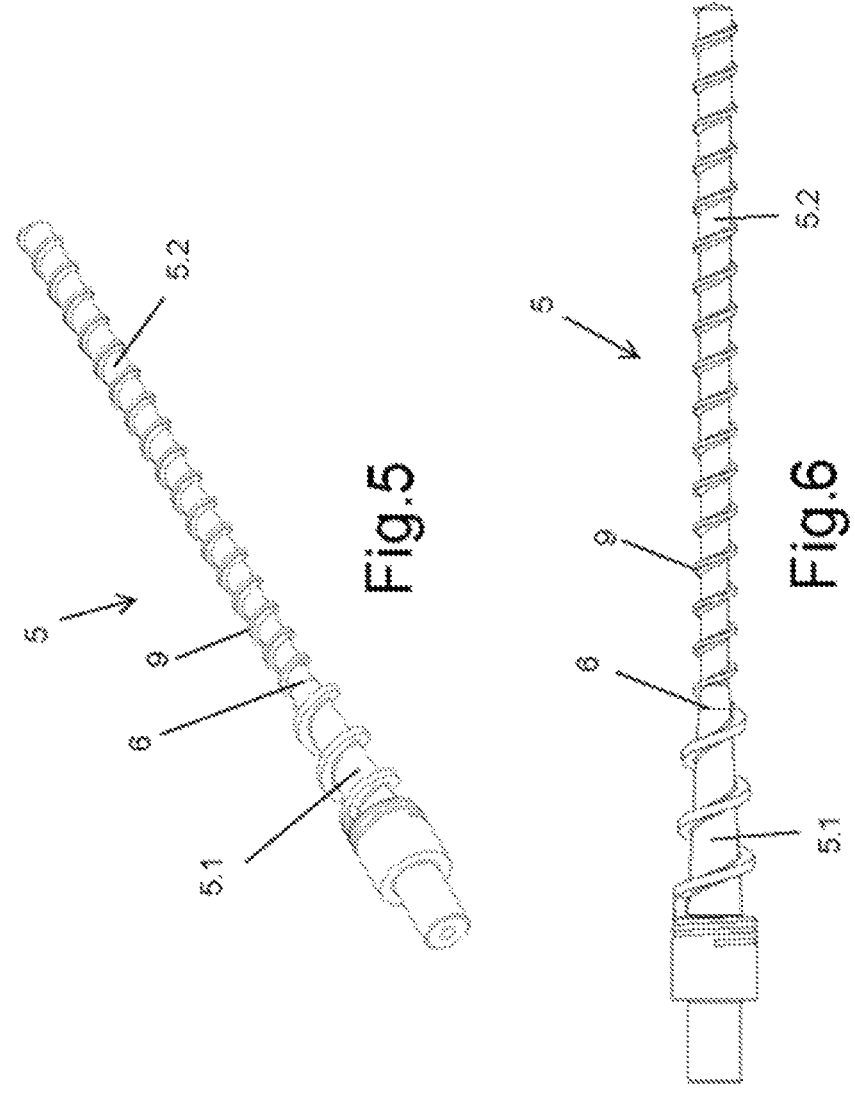
FIG. 5 is a perspective representation of the product conveyor spindle of the extruder machine of the invention.
FIG. 6 is a side view of said product conveyor spindle of the extruder machine of the invention.
Figures 7, 8:
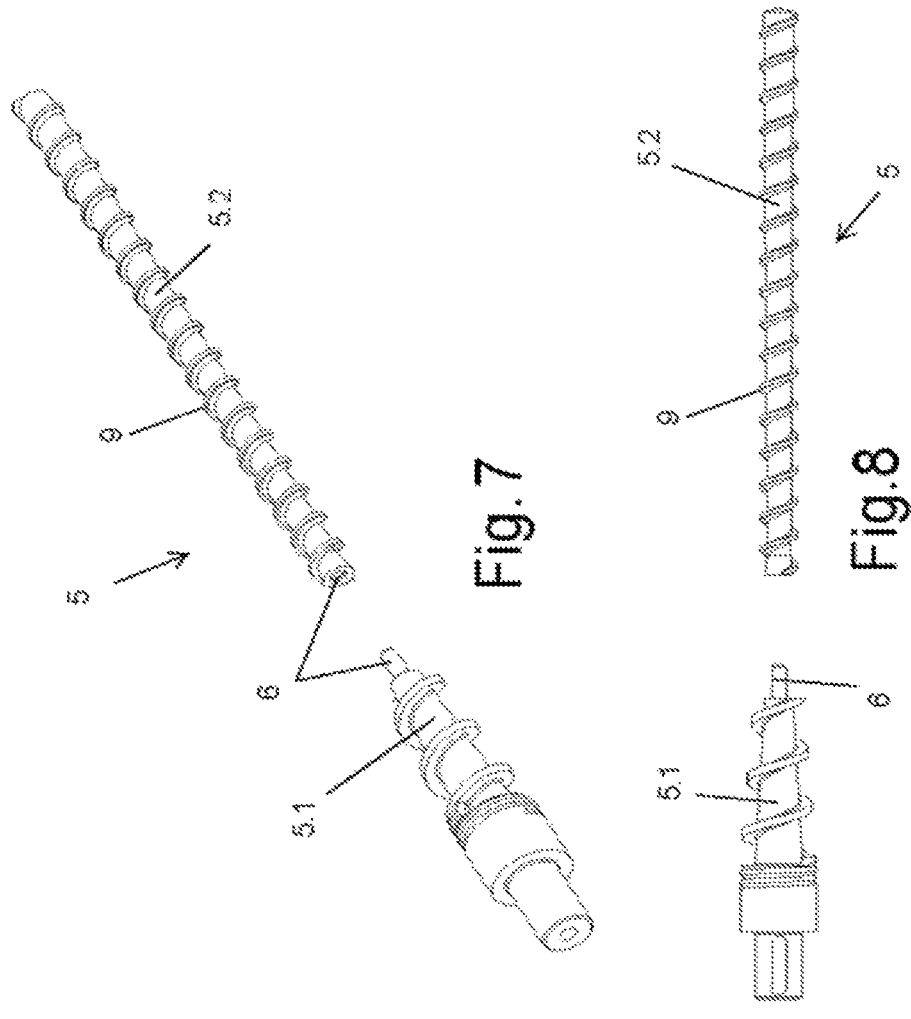
FIG. 7 is a perspective view of the product conveyor spindle with the two component sections uncoupled in a correlative assembly position.
FIG. 8 is a side view of the product conveyor spindle with the two component sections uncoupled in a correlative assembly position.

To further facilitate a suitable entry of the product in feeding the machine, as shown in FIG. 3, when applicable, the supply inlet (3) is provided with a direction that flows laterally off-centre with respect to the longitudinal axis of the spindle (5). This way the arrival of the solid pellet product into the recess (2) occurs tangentially with respect to the spindle (5). Thus, the product does not collide directly against the spindle (5), avoiding any backward rejection of part of the product due to the rotation of the spindle (5) and thereby achieving a more efficient feeding.

Furthermore, at the opening of the supply inlet (3) towards the recess (2), a ramp surface (7) is defined, having a tangential direction with respect to the spindle (5), which favours the entry of the solid product in pellets into the recess (2) to be collected by the spindle (5) and conveyed to the melting zone.

Figures 2, 2A, 2B, 2C, 2D, 2E:
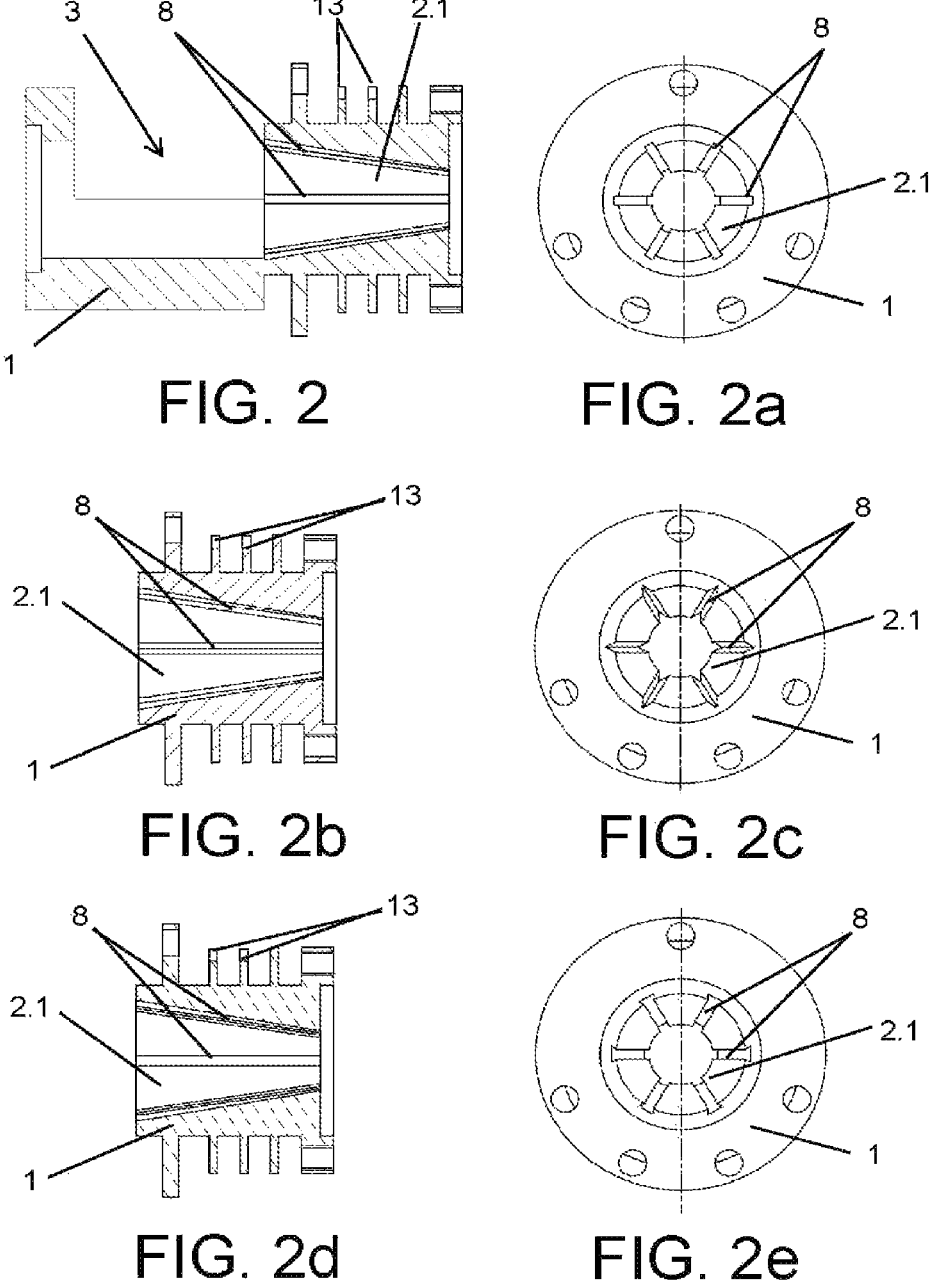
FIG. 2 shows an enlarged cross-sectional detail of the part of the structural body of the extruder machine that corresponds to the housing of the section of the product conveyor spindle with the largest diameter inside the machine where the conical zone of the recess can be seen.
FIGS. 2a-2q are cross-sectional and profile views of the conical zone for different configurations of the conical zone indentations.
Figures 2F, 2G, 2H, 2I, 2J, 2K:
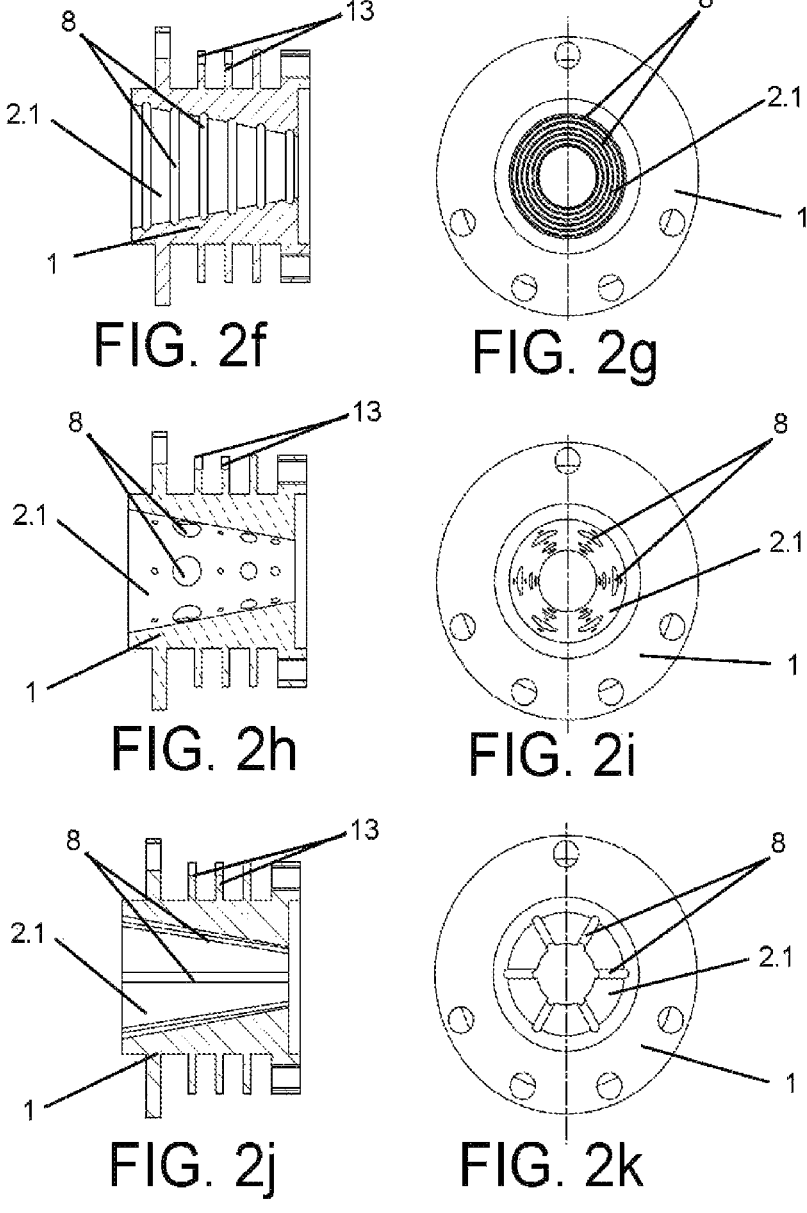
Figures 2L, 2M, 2N, 2O, 2P, 2Q:
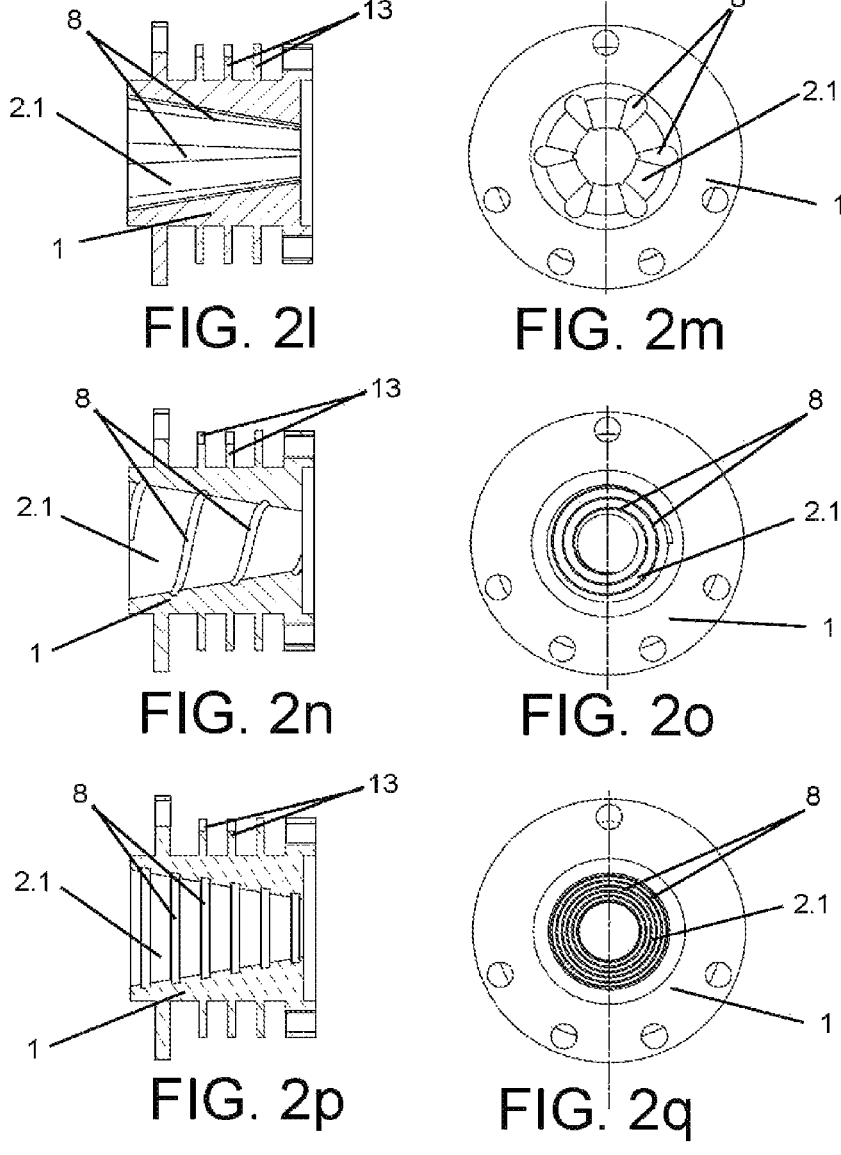

Furthermore, as mentioned above, in said feeding zone there is a narrowing that forms the conical zone (2.1) of the recess (2), which allows the product pellets to be directed towards the melting zone, reducing the spaces between the pellets. As can be seen in FIG. 2, on the surface of said conical zone (2.1) of the recess (2) a distribution of indentations (8) oriented in a longitudinal direction are peripherally arranged. These indentations (8) favour the circulation of the solid product in pellets through the conical zone of the recess (2), for the passage thereof to the melting zone that is subsequently located in the cylindrical part, preventing the flow of the product from being hindered by jams or a rebound effect. Although the indentations (8) are preferably arranged in the longitudinal direction, different configurations of same are provided, such as those shown in FIGS. 2a-2q. In these figures it can be seen how some indentations (8) are in the form of rings, transverse to the conveyance direction of the pellets, in a spiral shape, and even in a circumferential shape distributed according to different diameters. In addition, the longitudinal configuration thereof or the shape of the ends thereof can vary.

All these configurations contribute to forming a guiding system on the inner surface of the conical zone (2.1) which avoids jams, thus eliminating as much as possible the spaces between pellets when fed to the melting zone.

It is also envisaged that said conical zone (2.1) externally comprises blades (13). Said peripheral blades (13) are formed in the body (1) of the machine, so that they contribute to heat dissipation to prevent the pellets from partially melting during the feeding phase, reducing stickiness. In the case of returning to the feeding zone, any conglomerates that may form do not clog the feeding zone.

According to a design option, for the same purpose, it is envisaged that the machine comprises thermal insulation means (16) between the melting section and the feeding section, thereby preventing the heat and hot gases from the melting zone from melting the pellets being fed. Preferably, these thermal insulation means (16) are in the shape of a piece with a cylindrical, ring-like symmetry that is preferably located between the melting zone and the feeding zone. The material it is made of is a technical plastic preferably made of PEEK, PPS, PTFE, PA, or ABS.

All of this contributes to optimising the melting of the hot-melt product, achieving a more homogeneous melting that facilitates better compression of the molten product to expel the same according to the desired conditions and with greater speed and lower consumption.

The invention claimed is:
1. A machine for applying hot-melt products, comprising:
a structural body (1) provided longitudinally on the inside with a recess (2) extending between a supply inlet (3)

for the product in solid state and a discharge outlet (4) through which the product exits in a fluid state for its application, a spindle (5) disposed in the recess and fitted with a helical blade (9) for conveying the product through a feeding zone, a melting zone and/or a compression zone, wherein the recess (2) comprises a conical zone (2.1) with a narrowing separating the feeding zone from the melting zone, an inner periphery of the conical zone (2.1) includes a plurality of indentations (8), and the supply inlet (3) opens into the recess (2) in a laterally offset direction with respect to the longitudinal axis of the spindle (5) and directs entry of the product tangentially away from the longitudinal axis of the spindle (5).

2. The machine for applying hot-melt products according to claim 1, wherein the indentations (8) of the conical zone (2.1) are arranged longitudinally in the conveyance direction of the hot-melt product.

3. The machine for applying hot-melt products according claim 1, wherein the structural body (1) comprises externally in the conical zone (2.1) a plurality of heat dissipation blades (13).

4. The machine for applying hot-melt products according to claim 1, comprises thermal insulation means (16) between the feeding zone and the melting zone.

5. The machine for applying hot-melt products according to claim 1, wherein at the opening of the supply inlet (3) towards the recess (2) a ramp surface (7) is defined, having a tangential direction with respect to the spindle (5) and directing the product away from the longitudinal axis of the spindle (5).

6. The machine for applying hot-melt products according to claim 1, wherein the spindle (5) is made up of a plurality of spindle sections (5.1, 5.2) longitudinally associated with each other, one extending from the other by means of a detachable joint (6).

7. The machine for applying hot-melt products according to claim 6, wherein at least a first spindle section (5.1) extends at least partially along the feeding zone, and a second spindle section (5.2) extends at least partially along the melting zone and/or compression zone.

8. The machine for applying hot-melt products according to claim 1, wherein a spindle (5) diameter and/or a recess (2) diameter is at least partially longitudinally variable.

9. The machine for applying hot-melt products according to claim 8, wherein the diameter of the spindle (5) has a narrowing in the feeding zone in the conveyance direction of the product in correspondence with the narrowing of the conical zone (2.1) of the recess (2).

10. The machine for applying hot-melt products according to claim 1, wherein a pitch of the helical blade (9) is at least partially longitudinally variable.

11. The machine for applying hot-melt products according to claim 1, comprising a hopper (14) for feeding the product in solid state at the supply inlet (3) which comprises a device for measuring the level of the pellets in the hopper (14).

12. The machine for applying hot-melt products, according to claim 1, comprising a reservoir (10) arranged downstream from the discharge outlet (4) to store the product in fluid state.

13. The machine for applying hot-melt products, according to claim 12, comprising means for detecting the product level (11) in the reservoir (10).

14. The machine for applying hot-melt products, according to claim 1, comprising a pump (12) to condition the pressure of the product in the application.

\*   \*   \*   \*   \*